US011447693B2

(12) United States Patent
Jenkins et al.

(10) Patent No.: US 11,447,693 B2
(45) Date of Patent: Sep. 20, 2022

(54) OIL FIELD CHEMICAL-CARRYING MATERIAL AND PROCESS FOR MAKING THE SAME

(71) Applicant: Johnson Matthey Public Limited Company, London (GB)

(72) Inventors: David Jenkins, Billingham (GB); Chun-Tian Zhao, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 17/056,976

(22) PCT Filed: Jun. 19, 2019

(86) PCT No.: PCT/GB2019/051711
§ 371 (c)(1),
(2) Date: Nov. 19, 2020

(87) PCT Pub. No.: WO2019/243810
PCT Pub. Date: Dec. 26, 2019

(65) Prior Publication Data
US 2021/0198563 A1 Jul. 1, 2021

(30) Foreign Application Priority Data
Jun. 21, 2018 (GB) ..................................... 1810188

(51) Int. Cl.
*C09K 8/92* (2006.01)
*E21B 47/11* (2012.01)
*C09K 8/68* (2006.01)
*C09K 8/70* (2006.01)
*C09K 8/80* (2006.01)
(Continued)

(52) U.S. Cl.
CPC ................. *C09K 8/92* (2013.01); *B01J 2/006* (2013.01); *B01J 13/02* (2013.01); *C09K 8/68* (2013.01); *C09K 8/70* (2013.01); *C09K 8/805* (2013.01); *E21B 37/06* (2013.01); *E21B 41/02* (2013.01);
(Continued)

(58) Field of Classification Search
None
See application file for complete search history.

(56) References Cited

U.S. PATENT DOCUMENTS 11,084,966 B2 * 8/2021 Burns ..................... E21B 47/11
2004/0043906 A1 3/2004 Heath et al.
(Continued)

FOREIGN PATENT DOCUMENTS

EP 0261865 A2 3/1988
WO 2010/140033 A2 12/2010
(Continued)

Primary Examiner — John J Figueroa
(74) Attorney, Agent, or Firm — BakerHostetler (57) ABSTRACT

An oil field chemical-carrying material comprising polymeric particles and a process for making the same are disclosed. An oil field chemical is integrally incorporated into the granulated particle. The oil field chemical is in particular a tracer and the particle is in particular a proppant for use in hydraulic fracturing of a subterranean formation. Methods of delivering oil field chemicals, methods of monitoring subterranean formations, methods of tracing flow of fluid from hydrocarbon reservoirs and methods of hydraulic fracturing subterranean formations are also disclosed.

8 Claims, 2 Drawing Sheets (51) Int. Cl.
  *E21B 37/06* (2006.01)
  *E21B 41/02* (2006.01)
  *E21B 43/267* (2006.01)
  *B01J 2/00* (2006.01)
  *B01J 13/02* (2006.01)
  *B29B 9/12* (2006.01)

(52) U.S. Cl.
  CPC ............ *E21B 43/267* (2013.01); *E21B 47/11* (2020.05); *B29B 2009/125* (2013.01)

(56) References Cited

U.S. PATENT DOCUMENTS

| | | |
|---|---|---|
| 2013/0126158 A1 | 5/2013 | Gupta et al. |
| 2014/0262262 A1* | 9/2014 | Zheng ..................... C09K 8/03 507/224 |
| 2018/0086961 A1 | 3/2018 | Weaver et al. |

FOREIGN PATENT DOCUMENTS

| | | |
|---|---|---|
| WO | 2015/097116 A1 | 7/2015 |
| WO | 2016/089388 A1 | 6/2016 |
| WO | 2016/174413 A1 | 11/2016 |

* cited by examiner

Figure 1. Representations of Particle Structures

Figure 1A. Core-Shell

Figure 1B. Core Multi-Shell

Figure 1C. Multi-Core-Shell

Figure 1D. Micro-Matrix

Figure 1E. Micro-Matrix with Shell

Figure 1F. Multicore-micro-matrix-shell

OIL FIELD CHEMICAL-CARRYING MATERIAL AND PROCESS FOR MAKING THE SAME

FIELD OF INVENTION

The present invention concerns oil field chemical-carrying particulate materials, processes for producing oil field chemical-carrying particulate materials, methods of delivering oil field chemicals, methods of monitoring subterranean formations, methods of tracing flow of fluid from hydrocarbon reservoirs such as hydraulic fractured reservoirs and wells, methods of treating hydrocarbon reservoirs such as hydraulic fractured reservoirs and wells, and methods of hydraulic fracturing subterranean formations.

BACKGROUND

Hydraulic fracturing is common in the oil and gas exploration and production industry whereby a hydrocarbon-containing rock formation, or reservoir, is fractured in order to allow the hydrocarbon to flow out of the rock through the rock fractures. Many methods of fracturing a rock formation and maintaining a fracture open for the flow of hydrocarbon are known and practised in the industry. It is common to prop open a fracture by injecting proppant particles into the fracture so that flow of hydrocarbon from the fracture can be maintained.

A variety of oil field chemicals are used in oil wells. Examples of such chemicals include well treatment agents such as viscosity modifiers, density modifiers, flow modifiers, gelling modifiers, lubricants, foaming modifiers, scale inhibitors, disinfectants, anti-freezes or corrosion inhibitors. Examples of such well treatment agents include guar gum, acids including acetic acid, citric acid and phosphoric acid, sodium chloride, sodium carbonate, potassium carbonate, borate salts, glutaraldehyde, glycerol, isopropanol, ethylene glycol, lactose and polyacrylamide. It may be desirable to introduce the oil field chemicals into the well in such a way as to control their release into the oil well over time so as to achieve a desired result from the oil field chemical over time. Controlling the release over time may reduce the total material used, thus lowering costs and reducing environmental impact.

A particular example of an oil field chemical for which controlled release is desirable is tracers. It is well known to place tracers in a well in order to detect flow of fluid from a part of the well where a tracer has been placed. It is also known in the art to trace the flow of fluids from a reservoir, including fluids flowing after a fracturing operation, using tracers.

It can be desirable to introduce oil field chemicals such as tracers to a reservoir during a fracturing operation by carrying the oil field chemicals in a particulate material that can be introduced with the proppant and perform a proppant function. GB2518057 discloses a particulate tracer material comprising a plurality of particles of a porous particulate solid material. The particles have pores containing a tracer composition. A retaining material overlies the tracer composition in at least some of the pores. The retaining material retards the rate of discharge of the tracer compound from the tracer material compared with the rate of discharge from a similar tracer material in the absence of the retaining material. Particles of the particulate tracer material are joined together by means of a binder to form an agglomerated object. The agglomerated object may be introduced as a proppant and perform a proppant function.

The particulate materials carrying the oil field chemicals are usually transported to the targeted site of the hydraulic reservoir through the fracking liquid. Thus, the particulate materials should be compatible to the fracturing fluid. It would also be helpful for the fracturing fluid to carry and transport the particulate materials if the particle density is close to or comparable to the density of the fracturing fluid.

Good mechanical strength is also preferred for the proppant particulate materials carrying the oil field chemicals. Strong proppant particles are better preserved during the transport process, and are able to provide propping function, either working independently or as part of a proppant pack to the fractured formation.

Also, it is also often highly desirable for the proppant particulate materials to release the carried oil field chemicals in a sustained and controlled way, once they are introduced into the well, in order to maximise the efficiency of the oil field chemicals and reduce the frequency of complicated interventions.

It remains a challenge to design and manufacture the oil field chemical carrying particulate materials with the above and other desirable properties.

The present invention seeks to provide improved materials and methods for introducing oil field chemicals, including tracers, into hydrocarbon wells, in particular during a fracturing operation.

SUMMARY OF THE INVENTION

According to a first aspect of the invention there is provided a process for producing an oil field chemical-carrying material, the process comprising: distributing an oil field chemical in a formable polymeric or pre-polymeric matrix material to create a distributed mixture; processing and forming the resultant oil field chemical carrying mixture to produce a precursor formation comprising a distribution of the oil field chemical within a continuous solid matrix phase of polymeric material; comminuting the precursor formation to produce a plurality of particles.

According to a second aspect of the invention there is provided an oil field chemical-carrying material comprising a plurality of particles each comprising a continuous solid matrix phase of polymeric material, wherein an oil field chemical is integrally incorporated into and dispersed within the continuous polymeric matrix phase.

The particles of the second aspect of the invention are in the preferred case obtainable by and for example obtained by the process of the first aspect of the invention. That is to say, the particles are produced by comminution of a precursor formation comprising a distribution of the oil field chemical within a continuous solid matrix phase of polymeric material.

The formable matrix material comprises a starting material into which an oil field chemical-carrying material may be distributed before it is formed into the polymeric matrix of the precursor formation. The formable matrix material for example comprises a starting polymeric or pre-polymeric material or a mixture of polymeric or pre-polymeric material, where a pre-polymeric material in this context means any system or mixture of polymer, partially-reacted and unreacted monomer that is capable by suitable processing and forming of constituting the matrix of the precursor formation.

The formable matrix material is provided prior to forming in a state that facilitates distribution of the oil field chemical-carrying material. For example, the formable matrix material may be a flowable material into which the chemical-carrying material may be distributed by mixing. The flowable material may for example comprise a fluid phase such as a liquid, a flowable colloid or a flowable solid such as a free flowing solid powder, pelletised material etc.

Thereby, each plurality of the plurality of particles conveniently comprises a continuous solid matrix phase of polymeric carrier material, wherein the oil field chemical is integrally incorporated into and dispersed within the continuous polymeric matrix phase.

The particulate materials obtained from the comminuting process may be separated and graded according to the size of the particles. This is carried out through sieving or other size selection operations.

By integrally incorporating the oil field chemical into the continuous polymeric matrix phase a strong particle can be obtained which holds the oil field chemical securely so the oil field chemical can be safely delivered into a well or formation. With suitable selection of material a particle can be obtained which particle does not degrade and instantaneously release the oil field chemical as soon as the particle is introduced into the well and instead the oil field chemical is slowly released.

Particulate materials carrying oil field chemicals, and in particular tracers, and in particular such materials intended for use as and/or with normal proppant in a hydraulic fracturing operation which incorporate tracers, are known. These particulate materials generally comprise an inorganic matrix constituting, carrying or incorporating a chemical tracer. The inorganic matrix forms the structural body of a particle having similar properties and dimensions to that of the proppant material and enables the particle to function as or otherwise be used with the proppant. The chemical tracer is then released from the particle once the proppant is in situ in the well. Particles may be built up by agglomeration methods for example.

The invention is characterised by the use of a polymeric material as the bulk material for the solid matrix phase of the oil field chemical carrying particles of the invention, rather than an inorganic material. This may provide several advantages in particular.

First, the polymeric matrix phase offers the potential for more control over release rates, compared with the release rates of oil field chemicals such as tracers from inorganic particulates.

Second, the use of a polymer for the matrix phase provides for a rapid and effective method of fabrication of particulate oil field chemical carrying materials in accordance with the invention by comminution for example by milling of a bulk scale precursor formation Third, and particularly advantageously in relation to hydraulic fracturing, as a result of using polymer matrix, the density of the final particulate materials can be close to or comparable to the fracture fluid, thus facilitating the suspension of the oil field chemical carrying particulate materials in the fracture fluid. Also, the use of the polymer and production process allow production of solid non-porous particulate materials, which helps to achieve good mechanical strength if the particulate materials are used as or with proppant.

Fabrication is via a process with two principal stages.

First, a precursor formation is fabricated in that the oil field chemical is introduced to the polymeric matrix material and this is solidified to produce a precursor formation with the oil field chemical distributed as a discontinuous or continuous distribution within a continuous solid matrix phase of polymeric material. Second, the resultant precursor formation is comminuted to a suitable particle size.

In one embodiment of the process for producing an oil field chemical-carrying particulate material, a starting polymeric or pre-polymeric material or a mixture polymeric or pre-polymeric material in liquid state is used. After distributing the oil field chemical in the polymeric or pre-polymeric material or the mixture of polymeric or pre-polymeric material by mechanical blending, the oil field carrying mixture is then cast or injection moulded or extruded, and allowed to solidify by either thermal curing, light or radiation initiated curing, cooling or drying through evaporation to produce the precursor formation. The precursor formation is then comminuted by cutting, cut milling, pulverisation etc.

In another embodiment of the process for producing an oil field chemical-carrying particulate material, a starting polymeric or pre-polymeric material or a mixture polymeric or pre-polymeric material in the form of solid free flowing powder or pellets is used. After distributing the oil field chemical in the polymeric or pre-polymeric material or the mixture of polymeric or pre-polymeric material by mechanical blending. The oil field carrying mixture is then thermal extruded or injection moulded, and allowed to solidify by either cooling to produce the precursor formation. The mixing of oil field chemicals in the polymer matrix may be further enhanced in this step of process (e.g., in extrusion). The produced precursor formation is then comminuted by cutting, cut milling, pulverisation etc.

The oil field chemical is distributed through and dispersed within the continuous polymeric matrix phase. This is effected in accordance with the fabrication process of the invention in that the oil field chemical is effectively mixed into and dispersed within the continuous polymeric matrix phase in a fluid state or free flowing solid powder or pellet state, and the polymeric matrix material is then processed and formed to produce a solid precursor formation with the required distribution of oil field chemical in the polymeric matrix. The mixing may be further enhanced in the forming process.

The oil field chemical may be mixed with and dispersed within a fluid polymeric material phase to form any suitably dispersed distribution. The mixture may for example be formed as a solution, colloid or suspension.

The oil field chemical may be mixed with and dispersed within a solid polymeric material phase to form any suitably dispersed distribution. The mixture may for example be formed as a free flowing solid powders or free flowing pellet/powder mixture.

In a possible embodiment, the oil field chemical is distributed through and dispersed within the continuous polymeric matrix phase as a distributed discontinuous or continuous phase which is for example a distributed discontinuous solid phase. The distributed discontinuous solid phase may be introduced to the formable matrix material as a dispersed distribution of solid material or may be introduced to the formable matrix material as a dispersed discontinuous fluid phase to form a dispersed solid distribution as the resultant mixture is processed and formed, and for example as a fluid polymeric matrix material phase solidifies, or a flowable solid polymeric material is formed into an integrated continuous phase as the case may be. The degree of mixing i.e. the dispersion and distribution of the oil field chemicals in the final solid polymer phase may be increased during the processing and forming step.

In possible embodiments, the oil field chemicals are distributed in the starting polymeric or pre-polymeric materials by mixing or blending. The mixing or blending may be carried out mechanically or physically using different equipment. These include typically but not limited to the ways such as mechanical stirring and blending using a shaft stirrer in a container, or mixing using more sophisticated equipment such as twin-screw extruder or blender, single screw extruder or blender, static mixer, shear disperser or mixer, turbo-mixer, speed mixer, jet mixer.

In possible embodiments, the further processing of mixture of polymer or pre-polymer materials with oil field chemicals and formation of solid precursor can be carried out either by hand on small scale or with the aid of equipment such as on-line mixer and dispenser, single or twin-screw extruder with a die, injection moulding machine. Some equipment can be automatic.

The process of mixing distribution of oil field chemicals in and further processing and formation of the solid precursor can be integrated into one continuous process.

In some special cases, the solid precursor can be made by a 3-D printing or additive manufacturing process.

The comminuting of precursor formation, for example by cutting, cut milling, pulverisation, is usually achieved with equipment such as a cut mill, a hammer mill, a roller mill, a ball mill, a colloid mill, a cage mill and a pulveriser, a crusher, an ultrasonicator.

In a possible embodiment, the oil field chemical is distributed through and dispersed within the continuous polymeric matrix phase as a distribution of sub-particles and thereby dispersed within the continuous polymeric matrix phase of the resultant comminuted particles of the second aspect of the invention. Sub-particles are for example microparticles where "microparticle" refers to a particulate structure on micro-scale, i.e., with a size from nanometre to sub-millimetre, and for example with a volume weighted average particle size of between 0.05 µm and 600 µm, inclusive. Preferably the average particle size is between 0.1 µm and 500 µm, inclusive.

The sub-particles may be introduced to the formable matrix material as a dispersed distribution of solid sub-particles or may be introduced to the formable matrix material as a dispersed discontinuous fluid phase to form a dispersed distribution as the resultant mixture is processed and formed, and for example as a fluid polymeric material phase solidifies, or a free flowing solid polymeric material is formed into an integrated continuous phase as the case may be. The degree of mixing i.e. the dispersion and distribution of the oil field chemicals in the final solid polymer phase may be increased during the processing and forming step.

The oil field chemical may be mixed with and dispersed within the formable matrix material directly, or may be introduced in or on or incorporated into a carrier medium. In either case, the oil field chemical is thereby dispersed within the continuous polymeric matrix phase of the resultant particles after the comminution step.

Such a carrier medium may be liquid or solid. In one embodiment, the carrier medium is a sub-particle for example a microparticle as above defined and for example the oil field chemical is carried on or encapsulated within such a microparticle.

The oil field chemical may be directly incorporated into and dispersed within the continuous polymeric matrix phase as a distribution of microparticles or may be carried on or encapsulated within a microparticulate carrier medium which is incorporated into and dispersed within the continuous polymeric matrix phase.

In a possible embodiment of the process the oil field chemical is provided as a solid particulate and for example in microparticulate form as above described, the said particulate either consisting essentially of the oil field chemical or comprising the oil field chemical and a carrier medium, and the process comprises distributing the said particulate in the formable matrix material in a flowable state and for example a fluid state or free flowing solid state; and forming the resultant mixture to produce a distribution of the said particulate within a continuous solid matrix phase of the polymeric material, for example by solidifying the fluid or processing to form the free slowing solid mixture into an integrated continuous solid matrix phase as the case may be.

In another possible embodiment, the oil field chemical is integrally incorporated into and dispersed within the continuous polymeric matrix phase at a molecular level. For example, the oil field chemical is integrally incorporated into and dispersed within the continuous polymeric matrix phase in solution. In a possible embodiment of the process therefore the formable matrix material is provided in a fluid state and the oil field chemical is selected to be soluble in the matrix material in its fluid state and the process comprises dissolving the said particulate in the matrix material in the fluid state; solidifying the mixture to produce a molecular level distribution of the oil field chemical within a continuous solid matrix phase of the polymeric material. In another embodiment, the oil field chemical may be dissolved together with a polymer in a co-solvent. The solution is solidified by allowing the solvent to evaporate. In still another embodiment, the oil field chemical may be dissolved in a polymer melt, the melt is the processed and cooled to form solid matrix phase distributed with the oil field chemicals.

The polymeric or pre-polymeric material(s) used to form the continuous matrix phase are selected so that they can impart good mechanical strength, comparable to the fracking fluid density and sustained release of oil field chemicals to the final proppant particulate materials. The polymeric materials used may include any solid or solid-forming polymer, preferably a thermosetting polymer, a thermoplastic polymer, or a blend thereof. The blends can be a blend of thermosetting polymer with one or more thermosetting polymers, a blend of thermoplastic polymer with one or more thermoplastic polymers, or a blend of one or more thermoplastic polymers with one or more thermosetting polymers. The thermosetting polymers can be an epoxy resin, polyester, polyurethane, an acrylic polymer, a phenol-formaldehyde resin, a melamine-formaldehyde resin or a furan-formaldehyde resin, etc. The thermoplastic polymers can be a polypropylene (isotactic or syndiotactic), a polyethylene, a thermoplastic polyurethane, a polyether, a polyester (such as polyethyleneterephthalate, polybutyleneterephthalate), a polyvinyldifluoroethylene, a polyamide, an acrylic polymer, a polyimide, a polyether ether ketone, cellulose, a cellulose derivative, or a starch, and mixtures thereof.

Preferably, the polymer comprises a polyethylene, a polypropylene, a polyacrylate, an aliphatic polyamide (such as nylon-6, nylon-12), a polyurethane, a vinyl ester, an epoxy resin or a polybutylene terephthalate. The oil field chemical-carrying material particles of the second aspect of the invention or produced by the comminuting step of the first aspect of the invention may function as proppant alone, or they may be mixed with other proppant with the intention that they will end up in the same place as, and have similar durability to, the proppant particles with which they are mixed. It may be that the particles are proppant particles.

Preferably the oil field chemical-carrying material particles of the second aspect of the invention or produced by the comminuting step of the first aspect of the invention are from 0.1 to 3 mm in size. Particles of that size may be suitable for use with proppant material in hydraulic fracturing operations.

For non-spherical particles, particle size may be considered to be volume equivalent spherical diameter.

Where a target size range is given, it may be that at least a majority of particles fall within the target size range. It may be that at least 80% of particles fall within the target size range. For some applications, it may be that substantially all particles fall within the target size range.

In a refinement of the invention, a target size range is predetermined for particles of the second aspect of the invention or produced by the comminuting step of the first aspect of the invention and particles are screened to that target size range and discarded from a resultant product if they fall outside that target size range. For example particles may be screened by use of suitable mesh screens in familiar manner, for example during the comminuting step.

The process of the invention comprises forming a precursor formation comprising a solid continuous matrix of the polymeric material carrying a distribution of the oil field chemical as above described and then comminuting this formation to produce multiple particles of the desired size.

The precursor formation may be formed by any suitable solid-forming process, for example being cast, injection moulded, hot melt extruded. The precursor formation is for example formed as a bar or a strip. Pellets, large spheres or any other shapes may also be considered.

The precursor formation is comminuted to a suitable particle size by a suitable method applicable to the physical properties of the matrix material. For example, the precursor formation is processed by crushing, grinding, cutting, or combinations thereof, for example in a suitable mill. In a possible embodiment, the precursor formation is comminuted to a suitable particle size in a pulverising mill, for example a sieve cutting mill with a sieve appropriately sized for the desired particulate dimension.

The milling method does not necessarily produce particularly spherical particles.

For primary proppants that form the pack to be conductive to the flowback oil, high sphericity and roundness are preferred traditionally.

Although normally the shape is not the most critical target to consider in a pulverisation process such as is used in the comminution step of the present invention, the process is still able to provide particulate materials with reasonable shape. The sphericity and roundness of final particulate materials are dependent on the particular pulverisation process (cut, disc, rotary etc.), the condition of the milling process and size selected. In many case both sphericity and roundness greater 0.5 can be achieved. Thus, the manufacturing process envisaged for the current invention is able to provide primary proppants to form the conductive pack.

In practice however the manufacturing process is more suitable to produce oil field chemical carrying particulate materials which can be used additive or secondary proppants to be blended with the primary proppants. As the amount of the secondary proppant is very low compared to the primary proppant, the use of the oil field chemical carrying secondary proppant is normally not expected to change the conductivity formed by the primary proppants, so that sphericity of such secondary proppant may not be particularly important in providing a particulate product of appropriately controlled size distribution for use with the primary proppant material.

In an embodiment, the oil field chemical is microencapsulated and each particle comprises a dispersion of microcapsules within the continuous polymeric matrix phase.

In an embodiment of the process the oil field chemical is first microencapsulated and the mixture is formed by forming a dispersion of those microcapsules within the polymeric material in the fluid phase.

Thus the oil field chemical is slowly released from the microcapsule at a rate controlled by both the particle structure and the properties of the microencapsulation. This has a significant advantage in that the release rate of the oil field chemical can be influenced by varying the microencapsulation properties independently of the material composition of the continuous polymeric matrix phase. That may allow the design of particles that are optimised both in terms of the physical properties of the particle (such as crush strength, durability, size distribution, manufacturing cost) and the release profile of the oil field chemical. In other prior art systems, such optimisation may not be possible and compromises may need to be made.

Since the microcapsules are integrally incorporated into the particles, the microcapsules themselves are not released for as long as the particles remain intact and instead the oil field chemical is released from the microcapsules in a controlled way, for example influenced by the rate of diffusion of the oil field chemical through the microcapsule. Thus, the oil field chemical preferably passes through the microencapsulating materials and is released from the particle over a period of time in use in situ in a subterranean formation. The oil field chemical is preferably released over an extended period of time of months or years. Preferably the oil field chemical is released over a period of at least 1 month, more preferably at least 2 months. More preferably the oil field chemical is released over a period of at least 6 months. Most preferably the oil field chemical is released over a period of at least 1 year. Preferably the release rate is constant (for example varying by less than 10%, preferably less than 5% and more preferably less than 2%) over a period of time, for example over 2 months and preferably over 6 months. The period of constant release may occur after an initial period of high or low release rate.

Preferably the oil field chemical is microencapsulated in a microcapsule comprising the oil field chemical and a microencapsulant, where the microcapsule comprises a core shell structure, a core multi-shell structure, a multi core shell structure, a micro matrix structure, a micro matrix with shell structure or a multi core micro matrix with shell structure. Other compositions may be microencapsulated in the same way. Microencapsulated oil field chemicals, including tracers, suitable for use in the present invention are described in PCT application numbers GB2016/051172 and GB2016/051173.

The microcapsule preferably has either (a) a core comprising the oil field chemical with a shell around the core or (b) a micro matrix comprising the oil field chemical with or without a shell.

The term "core" refers to the central inner portion of a composition. The core can be a simple phase of oil field chemicals, or a mixture comprising one or more oil field chemicals and non-polymeric materials. The core can contain a mixture of a plurality of sub cores and non-polymeric materials. This configuration of a plurality of sub cores is referred to as a "multicore." Each of the sub cores comprise one or more oil field chemicals or other oil field chemicals as discussed above. Each of the sub cores can be surrounded by a polymeric shell.

The term "micro matrix" refers to a three-dimensional structure on micro scale, i.e., with a size from nanometre to sub millimetre. The three-dimensional structure is made of polymers and contains one or more oil field chemicals distributed within the structure. A micro matrix can be regarded as a special type of core. It differs from normal cores in that it has a three-dimensional polymeric structure. The polymers can be pre-formed or formed in situ by polymerization of monomers. The micro matrix can have oil field chemicals molecularly distributed in the entire micro matrix structure or comprise a plurality of sub cores, each containing an oil field chemical.

Preferably the microencapsulants form a three-dimensional structure in the form of shells or micro matrixes that contain the cores, sub cores, multi cores or oil field chemicals. Preferably the shell is a polymeric coating that at least partially surrounds a core or a micro matrix. The microencapsulant may comprise any polymer material that can form the major portion of a shell or micro matrix to microencapsulate the oil field chemical. Examples of such materials include, but are not limited to melamine formaldehyde, urea formaldehyde, phenol formaldehyde resin, melamine phenol formaldehyde resin, furan formaldehyde resin, epoxy resin, ethylene vinyl acetate copolymer, polypropylene polyethylene copolymer, polyacrylates, polyesters, polyurethane, polyamides, polyethers, polyimides, polyether ether ketones, polyolefins, polystyrene and functionalized polystyrene, polyvinylalcohol, polyvinylpyrrolidone, cellulose and cellulose derivatives, starch and starch derivatives, polysiloxanes, and mixtures thereof.

The materials used to form the shell or micro matrix can also include non-organic materials, such as silica, calcium carbonate or inorganic polymers, such as polyphosphazenes. The materials used to form the shell or micro matrix can be organic/inorganic hybrid materials, such as hybrid silica/polyamide materials.

The oil field chemical can be present at 1 to 99.5% by weight of the microcapsule. Preferably the oil field chemical is present at 10 to 98% by weight of the microcapsule.

Both solid and liquid oil field chemicals can be microencapsulated and recovered as solid powders.

The microencapsulated oil field chemical may be formed by a physical method, a chemical method or a physico-chemical method. The physical method can be selected from the group consisting of spray drying, fluidised bed coating, co extrusion, and solvent evaporation.

In an embodiment, the oil field chemical is microencapsulated and the microencapsulation primarily controls the rate of release of the oil field chemical from the oil field chemical-carrying material.

Additionally or alternatively the oil field chemical-carrying material particles of the second aspect of the invention or produced by the comminuting step of the first aspect of the invention may be coated, the coating material being selected to control the oil field chemical release and/or to contribute to the physical properties of the particles. The particles are coated in a coating step subsequently to the step of comminuting the precursor formation to produce a plurality of particles.

Examples of coating materials are formulations containing polymers such as, phenol resin, melamine-formaldehyde resin, epoxy resin, polyacrylates, polyesters, polyurethane, polyamides, polyimides, polyether ether ketones, polyolefins, polystyrene and functionalized polystyrene, polyvinylalcohol, polyvinylpyrrolidone, cellulose and cellulose derivatives, starch and starch derivatives, polysiloxanes, etc.

According to a third aspect of the invention, there is provided an oil field chemical-carrying material produced by the process of the first aspect of the invention.

Preferably the oil field chemical is a tracer. The invention may be particularly suited to use with tracers, since controlled release rates over time may be important in designing tracer products for particular applications.

The tracer is thus integrally incorporated into a plurality of particles in accordance with a first aspect of the invention. Because the tracer is integrally incorporated into the particles, the release rate of the tracer from the tracer-carrying material can be controlled, for example to be slow and sustained. The particles can survive for an extended period of time, such as months or years, in the formation. The particles may be mixed with proppant particles. The tracer can be delivered together with the particles to places where proppants are congregated.

Preferably, the tracer is microsencapsulated as above described.

Thus, according to a fourth aspect of the invention, there is provided a method of monitoring a subterranean formation, the method comprising injecting, for example as part of a hydraulic fracturing operation, a fluid containing an oil field chemical-carrying material according to the first aspect of the invention, the oil field chemical being a tracer, and detecting the tracer in fluids produced from the formation.

Similarly, according to a fifth aspect of the invention there is provided a method of tracing a flow of fluid from a hydrocarbon reservoir comprising the steps of placing within a well penetrating said reservoir an oil field chemical-carrying material according to the first aspect of the invention, the oil field chemical being a tracer, thereafter collecting a sample of fluid flowing from the well, and analysing said sample to determine the presence or absence of the tracer.

According to a sixth aspect of the invention there is provided a method of hydraulic fracturing a subterranean formation, the method comprising injecting into the subterranean formation a fluid containing an oil field chemical-carrying material according to the first aspect invention.

Preferably the particles are placed within the formation by injecting the particles along with a hydraulic fracturing fluid. For example, the particles may be mixed with proppant particles or may be proppant particles and may be introduced into the formation as part of the hydraulic fracturing operations using the techniques usually employed for proppant particles.

The oil field chemical-carrying material will typically be mixed, for example dry mixed, with proppant material in preparation for being introduced into the well with the proppant material. The oil field chemical-carrying material may be introduced into the well at the same time as the proppant to allow mixing during injection.

In relation to all aspects of the invention a preferred oil field chemical is a tracer. Methods of the invention may optionally further comprise determining the concentration of one or more tracers in fluids flowing from a well. The methods may comprise taking a plurality of samples of fluids flowing from the well over a period of time, analysing the samples and determining the concentrations of one or more tracers in the reservoir fluids over time.

The fluid which is to be traced may be a hydrocarbon fluid, for example an oil or gas, or alternatively an aqueous fluid such as produced water. The materials of the invention may contain one or more tracers for tracing hydrocarbon flow and one or more different tracers for tracing water flows. In some embodiments, it may be that the material includes a plurality of each of two or more different types of particle, each type of particle having a different microencapsulated tracer integrally incorporated within it. For example, a first type of particle may comprise a first tracer for tracing hydrocarbon flow and a second type of particle may comprise a second tracer for tracing water flows. In some embodiments, it may be that the particles comprise two or more tracers. For example, each particle may comprise a first tracer for tracing hydrocarbon flow and a second tracer for tracing water flows. In some embodiments, it may be that the tracer-carrying material consists of a single type of particles. The particles may comprise one or more tracers for tracing hydrocarbon flow, the particles may comprise one or more tracers for tracing water flows, the particles may comprise one or more tracers for tracing hydrocarbon flow and one or more different tracers for tracing water flows. All the tracers may be integrally incorporated into the particles and are for example microencapsulated.

Preferably the oil field chemical-carrying material comprises a microencapsulated tracer. Preferably the tracer is not naturally found in the fluid, the flow of which is to be traced. Suitable hydrocarbon-soluble tracers are known to the skilled person. The tracer is preferably a liquid or solid at room temperature. More than one tracer may be incorporated into the particles. The tracer may comprise a dye which can be detected by visual means or by a spectroscopic method. The dye may be coloured or not coloured to the eye. Fluorescent compounds, detectable by fluorescence spectroscopy, are well-known for use as tracers and may be suitable for this application. Chemical tracer compounds may be used as tracers. Such compounds may be detected by liquid or gas chromatography coupled to mass spectroscopy, electron capture detectors or other methods of detection. Atomic absorption spectroscopy or other methods may be used. The tracer is preferably a solid or liquid which is soluble in or miscible with a hydrocarbon fluid, especially a naturally-occurring oil or gas, or soluble in or miscible with an aqueous liquid. The tracer is preferably soluble in or miscible with produced fluids in the form of naturally-occurring oil, gas or produced water found in subterranean reservoirs. The selection of suitable tracers is known in the art and the skilled person is capable of selecting one or more appropriate tracers.

Suitable tracers include, but are not limited to classes of materials such as dyes, fluorescent materials, emissive materials, aromatic compounds (preferably halogenated aromatic compounds), cyclic compounds (preferably cycloalkanes, especially halogenated cycloalkanes) and aliphatic compounds (preferably halogenated aliphatic compounds). Each of these compounds having suitable functional groups, or derivatives of such functional groups, including but not limited to: alkyl, alkenyl, alkynyl, nitro, aldehyde, haloformyl, carbonate ester, amine, hydroxyl, phenyl, benzyl, carboxylate, sulfonate, carbonyl, acetal, halogen, partially or completely halogenated hydrocarbon chains or cycles, carboxyl, ester, methoxy, ethoxy, hydroperoxy, peroxy, ether, sulfo, borono, borate, boronate, orthoester, carboxamide, amide, nitrile, isonitrile, thiol, sulphide, or sulfonyl, or any combination of those groups. Suitable tracers include but are not limited to 4-bromodiphenyl ether, 4-bromobenzophenone, heptadecafluoro-1-decane, 1,5-diaminoanthraquinone, (1-bromoethyl)benzene, 2-bromoethylethylether, 5-chloro-3-phenyl-2,1-benzisoxazole, 2,4'-dichloroacetophenone, and 1-chloroanthraquinone.

More than one tracer may be contained within the same tracer-carrying material. Different combinations of tracers may be used in different tracer-carrying materials to identify different flows. Tracer-carrying materials containing different tracers or different combinations of tracers may be placed in different locations, e.g. at different parts of a well, so that passing fluid contacting each tracer-carrying material at its respective location may be identified.

When different tracer-carrying materials are used in a well, they may be designed to release tracers at different rates by appropriate selection of the microencapsulation. In this way fluid contacting the tracer-carrying materials may be detected at different stages in the production history of the well. The microencapsulated tracers in each tracer-carrying material may be the same or different. Different tracer-carrying materials containing different tracers may be made readily identifiable by colouring the tracer-carrying materials or applying other visible indicators.

The oil field chemical-carrying material may be used as, or with, proppant particles, whereby they are added to a fracturing fluid treatment and forced into fractures created in a rock formation. The oil field chemical-carrying material may remain in the fracture and may release the oil field chemical from the material when the material is in contact with a flow of hydrocarbon fluid. Preferably the oil field chemical-carrying material is used with other proppant particles so that only a proportion of the material forced into a fracture is oil field chemical-carrying material and the rest, and for example the major part, is inert proppant. The proportion of oil field chemical-carrying material to inert (non-oil field chemical-containing-) proppant can depend upon a number of factors, such as the production rate of the well, which effects the dilution of the oil field chemical in the produced fluid, the length of time that a release of oil field chemical into the production fluid is desired and the level of oil field chemical in the production fluid that is desired. When the oil field chemical is a tracer, the desirable level of the tracer in the production fluid may be determined based on the sensitivity of the analytic method used to detect the tracer. One of skill in the art would be able to determine the proportion of oil field chemical-carrying material to proppant based on these factors. The oil field chemical-carrying material is preferably free-flowing in that it can be poured from a container and does not significantly aggregate.

The oil field chemical-carrying material described above, when used in oil wells, can provide detectable levels, that is levels above 1 ppb, preferably above 10 ppb, more preferably above 100 ppb and yet more preferably above 1 ppm, of one or more oil field chemicals in production fluids for periods of at least 1 month, at least 2 months, at least 3 months, at least 6 months, at least 9 months, at least 12 months, at least 15 months, at least 18 months, at least 21 months or at least 24 months. Preferably the oil field chemical is a tracer.

An advantage of providing an oil field chemical-carrying material comprising a plurality of separate particles is that the process of forming the particles permits the incorporation of multiple oil field chemicals into the oil field chemical-carrying material to provide additional functionality. In some embodiments, the particles may further comprise one or more additional compositions to alter the particle properties. The additional composition is preferably a non-oil field chemical composition. For example, the additional composition may be a strengthening material. The oil field chemicals may, for example, be a well treatment agent such as a viscosity modifier, density modifier, flow modifier, gelling modifier, lubricant, foaming modifier, scale inhibitor, disinfectant, anti-freeze or corrosion inhibitor. Examples of such well treatment agents include guar gum, acids including acetic acid, citric acid and phosphoric acid, sodium chloride, sodium carbonate, potassium carbonate, borate salts, glutaraldehyde, glycerol, isopropanol, ethylene glycol, lactose and polyacrylamide. Other well treatment agents will be known to the skilled person. The multiple oil field chemicals, which are preferably separately microencapsulated, are integrally incorporated into the particles. The multiple oil field chemicals may be incorporated, preferably as microencapsulated compositions, when the particles are formed.

It will be appreciated that features described in relation to one aspect of the invention may be equally applicable to other aspects of the invention. For example, features described in relation to an oil field chemical-carrying material of the invention may be equally applicable to a method of the invention and vice versa. It will also be appreciated that optional features may not apply, and may be excluded from, certain aspects of the invention.

DESCRIPTION OF THE DRAWINGS

The invention will be further described by way of example only with reference to the following figures, of which.

DETAILED DESCRIPTION

The following definitions are provided in order to aid those skilled in the art in understanding the detailed description of the present invention.

As used in this specification and the appended claims, the singular forms "a", "an" and "the" include plural referents unless the context clearly indicates otherwise. Thus, for example, reference to "a matrix" includes a mixture of two or more matrices, unless specifically stated otherwise.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "hydrocarbon reservoir" or "reservoir" refers to a subterranean reservoir or formation which is manipulated, usually by drilling a borehole and placing a pipeline into the borehole, so as to extract oil and/or gas (usually with water) from the reservoir. The term includes reservoirs which are oil and/or gas producing.

The term "release" means a process where one or more oil field chemicals are introduced to a hydrocarbon reservoir or well in the form of a composition or an article described herein, and the one or more oil field chemicals move from the composition or article into one or more fluids in the reservoir. The term "release", when used in the context of laboratory testing, refers to the movement of one or more oil field chemicals from a composition or article into an eluent that is representative of a reservoir fluid.

The term "oil field chemical" means one or more compounds that can be released into a fluid from a subterranean hydrocarbon (oil or gas) reservoir or well for performing certain functions such as reservoir monitoring and well treatment. The term "oil field chemical" includes any class of chemical commonly used in an oil field, including tracers and well treatment agents, such as biocides.

"Wt %" refers to the weight of a component or ingredient relative to the total dry weight of a composition, e.g., weight percent. For example, a dosage form comprising 40 wt % of compound (1) and that weighs 1000 mg contains 400 mg of compound (1).

The term "microparticle" refers to a particulate structure on micro-scale, i.e., with a size from nanometre to sub-millimetre, and for example with a volume weighted average particle size of between 0.05 µm and 600 µm, inclusive. The term "microencapsulated" refers to the encapsulation of an oil field chemical in a microparticle.

The term "release rate" refers to the rate at which a compound is released from a composition or article described herein. The rate can be based on the amount of compound in terms of gravimetric measurement or concentration in the eluent or fluid at the time of sampling. Daily release rate is the amount of oil field chemical, in percent of the applied dose or ng per g or parts per million (ppm) of composition or article, released in a 24 h period.

The term "well treatment agent" refers to any of the various materials placed within a well or a hydrocarbon reservoir to address various undesired effects caused by scale formations, salt formations, paraffin deposition, emulsification (both water-in-oil and oil-in-water), gas hydrate formation, corrosion, asphaltene precipitation, and paraffin formation. Well treatment agents include biocides, scale inhibitors, hydrate and halite inhibitors, corrosion inhibitors, wax and asphaltene control substances, demulsifiers, gel breakers, drag reducers, salt inhibitors, gas hydrate inhibitors, oxygen scavengers, foaming agents, surfactants and well clean up substances (such as enzymes; organic molecules, acids, esters, and aliphatic compounds).

The term "tracer" means one or more compounds that can be used to track the movement of one or more fluids (oil, water or gas) in a hydrocarbon reservoir. The term "radioactive tracer" means a tracer which is radioactive. The term "chemical tracer" means a non-radioactive chemical compound that is used as a tracer. A tracer can include a DNA or RNA. A tracer can also include any nanoparticle or nanocomposite material.

The term "eluent" refers to any fluid, whether stationary, stirred, or flowing, which contacts the composition or article and is capable of allowing the release of an oil field chemical contained within the composition or article.

The term "reservoir fluid" refers to any fluid or gas produced from a hydrocarbon reservoir and includes gas, oil, water and mixtures thereof.

Example compositions are described in which the oil field chemical is a chemical tracer. Any chemical compound can be used as a tracer with the present invention if it does not interfere or interact undesirably with other materials present in the oil well at the levels used. Preferably, before the tracer is added to the well, the tracer is not present at a measurable level in reservoir fluids from the well to be tested. This means that background levels of the tracer should be less than the limit of detection. It is also preferred that the tracer can be measured at levels sufficiently low to allow its use to be economical. While upper limits for the concentration of the tracer in reservoir fluid can be as high as about 10,000 parts per million, for a variety of reasons, such as economical, toxicological, causing unacceptable interactions with other materials present in an oil well, etc. the tracers can be detectable at a lower limit of about 50 parts per million, preferably about 1 ppm, more preferably about 100 parts per billion, even more preferably about 10 parts per billion. Depending upon the tracer selected and the analytical method used, the lower limit of detection can particularly be 1 part per billion, more particularly 100 parts per trillion, even more especially 10 parts per trillion, most especially 1 part per quadrillion in the fluid being analysed. The tracer can be a radioactive tracer but preferably the tracer is not a radioactive tracer. Preferably the tracer is a chemical tracer.

More than one tracer can be used to measure multiple operations in the same well. For example, oil wells often have more than one producing strata or zone. In the practice of the present invention, a fracture could be done on one stratum using a first tracer and a fracture could be done on another stratum using a second tracer. Horizontal drilling allows for the drilling of multiple bores terminating in a common bore that connects to the surface. In multilateral wells such as these, several different tracers could be used to keep track of concurrent recovery of materials from the several legs (lateral bores) of such wells.

Example Fabrication Method

Fabrication is via a process with two principal stages. First, a precursor formation is fabricated in that the oil field chemical is introduced to a formable matrix material comprising a suitable polymeric or pre-polymeric matrix material in a liquid state to form a suitable distribution for example as a dispersion therein and this is then solidified to produce a precursor formation with the oil field chemical distributed as a discontinuous distribution within a continuous solid matrix phase of polymeric material. Second, the resultant precursor formation is milled to a suitable particle size.

As will be appreciated, this is by way of example only. In particular the use of a liquid polymeric or pre-polymeric matrix material is merely one way of producing the desired distribution of oil field chemical in the precursor formation and milling is merely one way of producing particles therefrom.

Figure 1A:
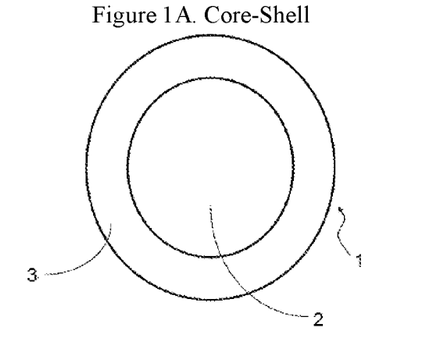
FIGS. 1A-1F are representations of the structures of different configurations of microcapsules suitable for use in certain optional embodiments of the invention.
Figure 1B:
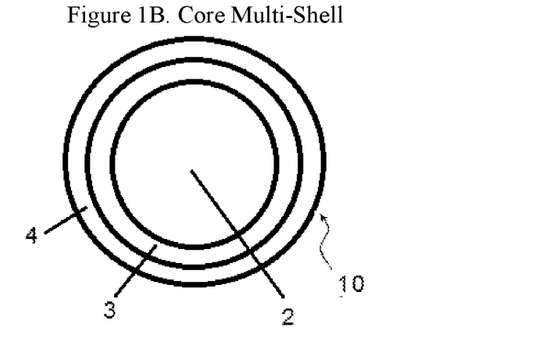
Figure 1C:
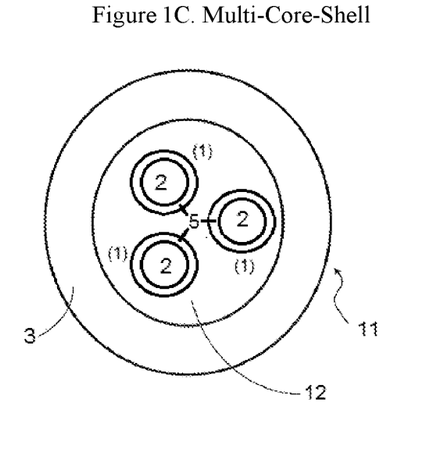
Figure 1D:
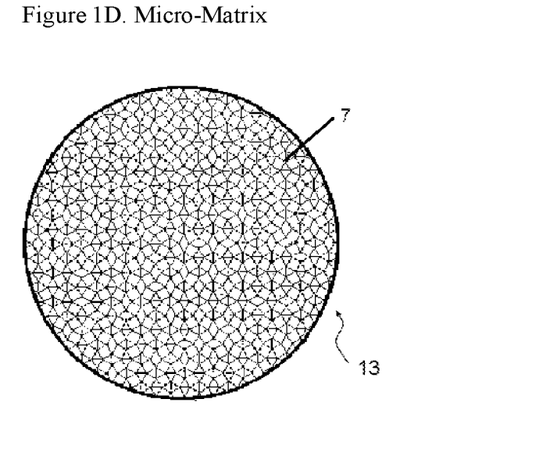
Figure 1E:
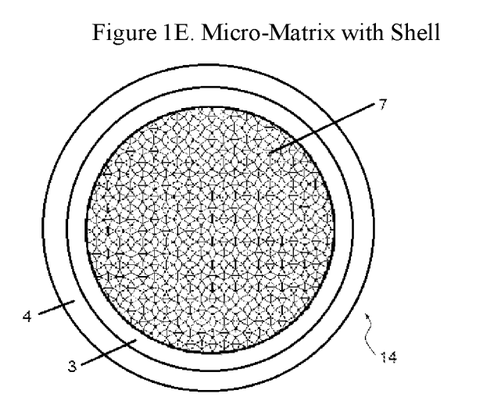
Figure 1F:
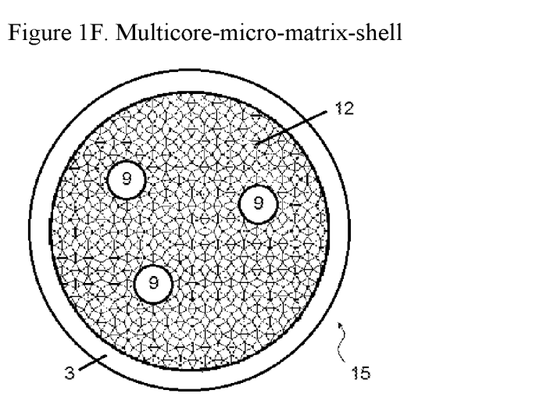
Figure 2:
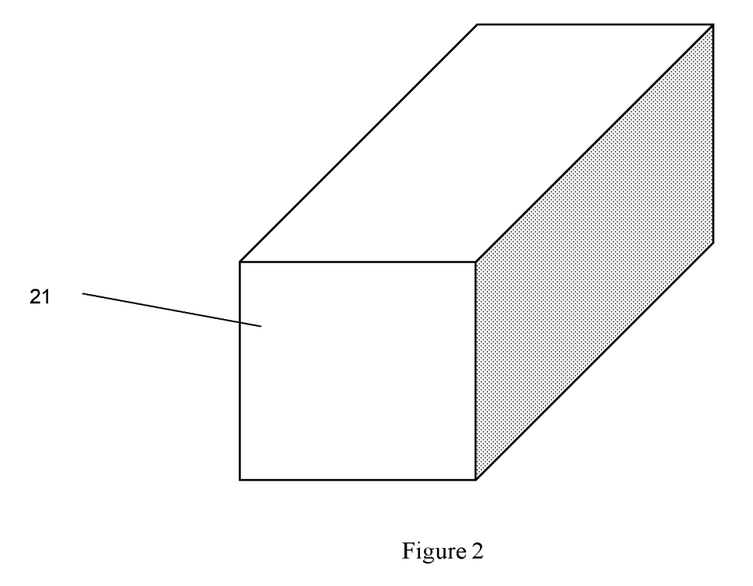
FIG. 2 is a precursor bar fabricated in accordance with the principles of the invention.
Figure 3:
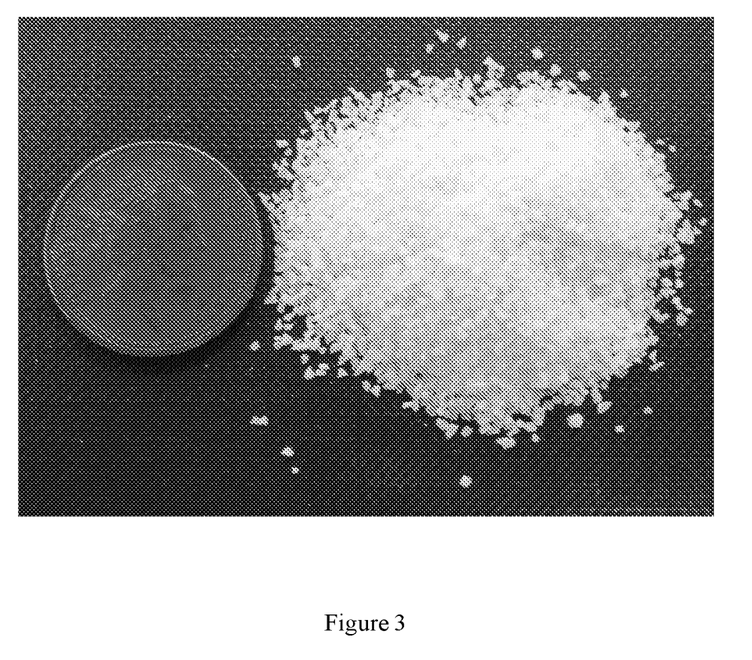
FIG. 3 is a particulate material carrying tracer and suitable for use as a proppant fabricated from the precursor bar of FIG. 2 in accordance with the principles of the invention.

FIGS. 1 to 3 illustrate an example process schematically.

The oil field chemical may be mixed directly with the polymeric matrix material. Alternatively, if it is not susceptible to direct dispersion and/or to provide other properties such as controlled elution rates, it may be introduced in or on a carrier material. For example, it may be microencapsulated. Microencapsulated oil field chemicals, including tracers, suitable for use in the present invention are described in PCT application numbers GB2016/051172 and GB2016/051173.

Suitable microcapsule structures are shown in FIG. 1.

The microcapsules can comprise at least one of the following structures:

(a) a core shell structure comprising (i) a core comprising at least one oil field chemical and (ii) a shell comprising a polymeric microencapsulant;

(b) a core multi-shell structure comprising (i) a core comprising at least one oil field chemical, (ii) a first shell comprising a polymeric microencapsulant located adjacent to the core; and (iii) one or more additional shells located over the first shell, each additional shell comprising a polymeric microencapsulant that is different than the polymeric microencapsulant in an adjacent shell;

(c) a multi-core shell structure comprising (i) a core comprising a plurality of sub-cores where each sub-core comprises at least one oil field chemical, and optionally having a shell at least partially covering each of the sub-cores, and the sub-cores are dispersed in a non-polymeric compound, and (ii) a shell comprising a polymeric microencapsulant;

(d) a micro-matrix structure comprising a core comprising at least one oil field chemical entrapped within a micro-matrix comprising a polymeric microencapsulant;

(e) a micro-matrix with a shell structure comprising (i) a core comprising at least one oil field chemical entrapped within a micro-matrix comprising a polymeric microencapsulant; and (ii) a shell comprising a polymeric microencapsulant;

(f) a multi-core-micro-matrix with a shell structure comprising (i) a micro-matrix comprising a plurality of sub-cores, where each sub-core comprises at least one oil field chemical, and the sub-cores are entrapped within the micro-matrix, and (ii) a shell comprising a polymeric microencapsulant.

FIG. 1A depicts a core shell structure (1) comprising (i) a core (2) comprising at least one oil field chemical and (ii) a shell (3) comprising a polymeric microencapsulant.

FIG. 1B depicts a core multi-shell structure (10) comprising (i) a core (2) comprising at least one oil field chemical, (ii) a first shell (3) comprising a polymeric microencapsulant; and (iii) one or more additional shells (4) that at least partially cover the first shell.

FIG. 1C depicts a multi-core shell structure (11) comprising (i) a core (12) comprising a plurality of sub-cores (1) each comprising at least one oil field chemical within the sub-core (2) and optionally having a shell (5) at least partially covering the sub-cores, and (ii) a shell (3) comprising a polymeric microencapsulant around the core. The multi-core shell structure can also contain one or more additional shells that at least partially cover the first shell as shown in FIG. 1B as item (4).

FIG. 1D depicts a micro-matrix (13) comprising at least one oil field chemical entrapped within a three-dimensional polymeric microencapsulant (7).

FIG. 1E depicts a micro-matrix with a shell structure (14) comprising (i) a micro-matrix (7) comprising at least one oil field chemical entrapped within the micro-matrix, (ii) a first shell (3) comprising a polymeric microencapsulant, where the first shell at least partially covers the micro-matrix; and (iii) one or more additional shells (4) that at least partially cover the first shell. The structure can have only a first shell (3) and not have one or more additional shells (4).

FIG. 1F depicts a multi-core-micro-matrix with a shell structure (15) comprising (i) a core (12) comprising a micro-matrix (7) comprising a three-dimensional polymeric microencapsulant and a plurality of subcores (9) within the micro-matrix, (ii) a first shell (3) comprising a different polymeric microencapsulant. The structure can also contain one or more additional shells (not shown) that at least partially cover the first shell, as shown as item 4 in FIG. 1E.

The microcapsules, cores and shells are shown graphically in FIGS. 1A-1F as circles for ease of illustration. The microcapsules can have any shape, including, but not limited to a sphere, a rod, an ovoid, a pseudo-cuboid, a ring, etc.

The microcapsules comprise two groups of components: oil field chemicals and microencapsulants. Microencapsulants comprise organic polymer and/or inorganic materials. The microencapsulant can further comprise emulsifiers, stabilisers or both. The microencapsulant can form shells and/or a micro-matrix in a microcapsule.

The method of the invention comprises forming a precursor formation comprising a solid continuous matrix of the polymeric material carrying a distribution of the oil field chemical, whether optionally microencapsulated as above, incorporated directly or otherwise, and then comminuting this formation to produce multiple particles of the desired size.

In the example, an epoxy formulation was used as the bulk matrix material. A suitable precursor formation is shown in the form of the cast bar (20) of FIG. 2.

The precursor formation was milled to a suitable particle size in a sieve cutting mill and size graded to produce the resultant 20/40 mesh fraction of particulate shown in FIG. 3 with a UK one penny coin also shown for scale.

The oil field chemical-carrying material is in a preferred application used as and/or with proppant in a hydraulic fracturing operation. The particles will typically be mixed, for example dry mixed, with proppant material in preparation for being introduced into the well with the proppant material. The oil field chemical-carrying material may be introduced into the well at the same time as the proppant to allow mixing during injection.

It may be that such particles, whether fabricated via the example method or otherwise in accordance with the invention, should have a size of between 0.425 and 3 mm, preferably between 0.425 and 1.18 mm. Preferably the particles have a size of between 8 and 140 mesh (that is, between 105 µm and 2.36 mm), preferably between 16 and 70 mesh (that is, between 210 µm and 1.18 mm), and more preferably between 40 and 70 mesh (that is, between 210 µm and 420 µm). In some embodiments, the particles may have a size of between 30 and 50 mesh (that is, between 297 µm and 595 µm), between 40 and 70 mesh (that is, between 210 µm and 420 µm) or between 70 and 140 mesh (that is, between 105 µm and 210 µm). In that way, the particles may match the size of typical proppant materials.

The particles produced by the process of the invention advantageously compatible to normal fracking fluids have a density such that they are carried along with aqueous fracturing fluids. The particles are advantageously the same size as other proppant particles so they don't segregate during storage or transport.

Examples are given of the use of the above general method to produce a proppant carrying a directly mixed standard water tracer and a proppant carrying a microencapsulated oil tracer.

Example Formulations

Example 1—Preparation of a Solid Water Tracer/Polymer Granulated Material by Casting and Milling A tracer (a sodium salt of benzoic acid, in the form of a powder) was sieved through a 450 µm sieve. 10 g of tracer was mixed with 75 g of epoxy resin (bisphenol-A-(epichlorohydrin)) to form a dispersion of solid in liquid prepolymer mixture. 15 g of epoxy hardener (triethylenetetramine) was added to the mixture, and mixed until fully dispersed. The liquid mixture was cast into a mould and cured in an oven at temperature (60° C.), before curing into a solid article (solid bar, dimensions, 7 mm×15 mm×450 mm). After 1 hour, the solid article was removed from the oven and de-moulded, before being left to cool to room temperature. The solid article was processed through a cutting mill, containing a sieve cassette, to produce a granulated product at a particle size between 850 to 100 microns.

Example 2—Preparation of a Solid Water Tracer/Polymer/Reactive Diluent Granulated Material by Casting and Milling A tracer (a sodium salt of benzoic acid, in the form of a powder) was sieved through a 450 µm sieve. 1.0 Kg of tracer was mixed with 7.33 Kg of epoxy resin (bisphenol-A-(epichlorohydrin)) and 0.2 Kg of reactive diluents to form a dispersion of solid in liquid prepolymer mixture. 1.47 g of epoxy hardener (triethylenetetramine) was added to the mixture, and mixed until fully dispersed. The liquid mixture was cast into a mould and cured in an oven at temperature (60° C.), before curing into a solid article (solid bar, dimensions, 7 mm×15 mm×450 mm). After 1 hour, the solid article was removed from the oven and de-moulded, before being left to cool to room temperature. The solid article was processed through a cutting mill, containing a sieve cassette, to produce a granulated product at a particle size between 850 to 100 microns.

Example 3—Preparation of Solid Oil Tracer/Polymer Granular Material by Casting and Milling A tracer (a haloaromatic compound in the form of a powder) was sieved through a 450 µm sieve. 1 Kg of tracer was mixed with 7.5 Kg of epoxy resin (bisphenol-A-(epichlorohydrin)) to form a dispersion of solid in liquid prepolymer mixture. 1.5 Kg of epoxy hardener (triethylenetetramine) was added to the mixture, and mixed until fully dispersed. The liquid mixture was cast into a mould and cured in an oven at temperature (60° C.), before curing into a solid article (solid bar, dimensions, 4 mm×24 mm×440 mm). After 1 hour, the solid article was removed from the oven and de-moulded, before being left to cool to room temperature. The solid article was processed through a cutting mill, containing a sieve cassette, to produce a granular product at a particle size between 850 to 100 microns.

Example 4—Preparation of Solid Microencapsulated Oil Tracer/Polymer Granular Material by Casting and Milling A microencapsulated tracer (as described in GB2540840) was sieved through a 450 µm sieve. 1 Kg of tracer was mixed with 7.5 Kg of epoxy resin (bisphenol-A-(epichlorohydrin)) to form a dispersion of solid in liquid prepolymer mixture. 1.5 Kg of epoxy hardener (triethylenetetramine) was added to the mixture, and mixed until fully dispersed. The liquid mixture was cast into a mould and cured in an oven at temperature (60° C.), before curing into a solid article (solid bar, dimensions, 4 mm×24 mm×440 mm). After 1 hour, the solid article was removed from the oven and de-moulded, before being left to cool to room temperature. The solid article was processed through a cutting mill, containing a sieve cassette, to produce a granular product at a particle size between 850 to 100 microns.

Example 5—Preparation of a Solid Oil Tracer/Polymer Granular Material by Compounding and Milling 4.0 kg of polybutylene terephthalate was dried in a vacuum oven at 40° C. for 24 hours. 1.0 Kg of a tracer (a haloaromatic compound) was compounded to the dried polybutylene terephthalate and extruded through a twin-screw extruder at 240° C. The extrudate was cooled with water and then pelletized. The pellets were then dried at 110° C. for 3 hours. 200 g of pellets were processed through a cutting mill, containing a sieve cassette, to produce a granular product at a particle size between 850 to 100 microns.

Example 6—Preparation of a Solid Microencapsulated Oil Tracer/Polymer Granulated Material by Compounding and Milling 1.8 Kg of polybutylene terephthalate was dried in a vacuum oven at 40° C. for 24 hours. 600 g of microencapsulated tracer particles (as described in GB2540840) were compounded with 1.8 kg of polybutylene terephthalate and extruded through a twin-screw extruder at 240° C. The extrudate was cooled with water and then pelletized. The pellets were then dried at 110° C. for 3 hours. 200 g of pellets were processed through a cutting mill, containing a sieve cassette, to produce a granular product at a particle size between 850 to 100 microns.

These are example formulations only. Suitable tracers and other oil field chemicals might include the following.

Oil Soluble Tracers

Tracers used to track the movement of oil soluble materials generally have low water solubility and high (>1000) organic/water partition coefficients. Several families of such compounds have been used. Illustrative examples of suitable tracer compounds of the present invention are organic compounds selected from the hydrocarbons and halogenated hydrocarbons. Mixtures of these compounds can also be used although single compounds are preferred. The tracer compound can preferably be a halogenated aromatic, polycyclic aromatic, heterocyclic aromatic, aromatic ketone, cycloalkane, or aliphatic compound, where the compound including at least one halogen selected from the group consisting of Br, Cl, F and I. Suitable tracers include, but are not limited to 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride, 1-bromo-4-fluorobenzene, perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH), p-Perfluorodimethylcyclohexane (p-PDMCH), perfluorotrimethylcyclohexane (PTMCH), perfluoroethylcyclohexane (PECH), and perfluoroisopropylcyclohexane (IPPCH).

Oil soluble tracers can also be oil dispersible nanoparticles which may be detected by analytical techniques such as light absorption and emission (e.g., Raman, UV, IR and fluorescence) or electrochemical methods.

Water Soluble Tracers

Water soluble tracers can be used to trace the movement of production fluids containing water. Groups of compounds that are commonly described in the art as dyes, pigments, and colorants can be used. These compounds are often visible to the eye in either ambient or ultraviolet light. Suitable tracers useful with the present invention include but are not limited to those selected from the group consisting of: Acridine Orange; 2-anthracenesulfonic acid, sodium salt; Anthrasol Green IBA (Solubilized Vat Dye); bathophenanthrolinedisulfonic acid disodium salt; amino 2,5-benzene disulfonic acid; 2-(4-aminophenyl)-6-methylbenzothiazole; Brilliant Acid Yellow 8G (Lissamine Yellow FF, Acid Yellow 7); Celestine Blue; cresyl violet acetate; dibenzofuransulfonic acid, 1-isomer; dibenzofuransulfonic acid, 2-isomer; 1-ethylquinaldinium iodide; fluorescein; fluorescein, sodium salt (Acid Yellow 73, Uranine); Keyfluor White ST (Flu. Bright. 28); Keyfluor White CN; Leucophor BSB (Leucophor AP, Flu. Bright. 230); Leucophor BMB (Leucophor U, Flu. Bright. 290); Lucigenin (bis-N-methylacridinium nitrate); mono-, di-, or tri-sulfonated naphthalenes, including but not limited to—1,5-naphthalenedisulfonic acid, disodium salt (hydrate) (1,5-NDSA hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenedisulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; Phorwite CL (Flu. Bright. 191); Phorwite BKL (Flu. Bright. 200); Phorwite BHC 766; Pylaklor White S-15A; 1,3,6,8-pyrenetetrasulfonic acid, tetrasodium salt; pyranine, (8-hydroxy-1,3,6-pyrenetrisulfonic acid, trisodium salt); quinoline; Rhodalux; Rhodamine WT; Safranine O; Sandoz CW (Flu. Bright, 235); Sandoz CD (Flu. Bright. 220); Sandoz TH-40; Sulforhodamine B (Acid Red 52); Tinopal 5BM-GX; Tinopol DCS; Tinopal CBS-X; Tinopal RBS 200; Titan Yellow (Thiazole Yellow G), and any existing ammonium, potassium and sodium salts thereof. Preferred fluorescent tracers are 1,3,6,8-pyrenetetrasulfonic acid, tetrasodium salt and 1,5-naphthalenedisulfonic acid, disodium salt (hydrate).

Water soluble tracers can also be water dispersible nanoparticles, which may be detected by analytical techniques such as light absorption and emission (e.g., Raman, UV, IR and fluorescence) and electrochemical methods.

Preferably the chemical tracers useful with the present invention include, but are not limited to: halogenated benzoic acids, salts and compounds derived from the acid such that they hydrolyze to form the acids, or salts thereof, in the reservoir, including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid; 2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; 2,4,6-trifluorobenzoic acid and the brominated, chlorinated and iodinated analogs thereof. When more than one halogen atom is present on the benzoic acid, the halogens can be the same or different. Preferably, the salts of the halogenated benzoic acids are sodium salts or potassium salts.

Well Treating Agents

Numerous types of well treating agents are known in the art. Well treating agents are used to inhibit, control, prevent or treat various conditions that can affect the reservoir and the production of oil and/or gas from the reservoir. Well treating agents are generally described in families based on the function they perform, such as scale inhibitors, asphaltene dispersants and inhibitors, acid stimulation chemicals, sand control agents, napthenate and other carboxylate anti-fouling agents, corrosion control agents, gas hydrate control agents, wax (paraffin wax) control agents, demulsifiers, foam control agents, flocculants, biocides, hydrogen sulfide scavengers, oxygen scavengers, drag-reducing agents (DRA's), hydrotesting chemicals and foamers for gas well deliquification. In many cases, it would be helpful if well treating agents were able to be slowly released over time to help maintain the well treating agent at an effective concentration in the well or reservoir. Various types of well treating agents are described by Malcolm A. Kelland in Production Chemicals for the Oil and Gas Industry, Second Edition Hardcover, 16 Apr. 2014.

Biocides include oxidising biocides; nonoxidizing organic biocides, such as aldehydes, quaternary phosphonium compounds, quaternary ammonium compounds, cationic polymers, organic bromides, metronidazole, isothiazolones (or isothiazolinones) and thiones, organic thiocyanates, phenolics, alkylamines, diamines and triamines, dithiocarbamates, 2-decylthioletnanamine and hydrochloride salts, triazine derivatives, and oxazolidines; and biostats (control "biocides" or metabolic inhibitors), such as anthraquinone, nitrates and nitrites. Specific examples of biocides include acrolein, bronopol, 2,2-dibromo-3-nitrilopropionamide, formaldehyde, glutaraldehyde, tetrakishydroxymethyl phosphonium sulfate (THPS), $[NR_1R_2R_3R_4]^+Cl^-$ (where $R_1$=alkyl($C_{14}$-$C_{18}$) and $R_2$, $R_3$, and $R_4$=methyl or benzyl or $R_1$ and $R_2$=alkyl($C_{10}$) and $R_3$ and $R_4$=methyl), dibromonitrilopropioanamide (DBNPA), Dazomet (MITC), tributyl tetradecyl phosphonium chloride (TTPC), halogenated oxidizers, dithiocarbamate, methylene bisthiocyanate (MBT), didecylmethylquat, methylbenzylcocuat, cocodiamine diacetate, cocodiamine, and chlorine dioxide.

Scale inhibitors include polyphosphonates, phosphate esters, nonpolymeric phosphonates and aminophosphonates, polyphosphonates, phosphino polymers and polyphosphinates, polycarboxylates, biodegradable polycarboxylates and polysulfonates. Exemplary anionic scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Asphaltene dispersants and inhibitors include low molecular weight, nonpolymeric asphaltene dispersants, such as low-polarity nonpolymeric aromatic amphiphiles, sulfonic acid-base nonpolymeric surfactant asphaltene dispersants, nonpolymeric surfactant asphaltene dispersants with acidic head groups, amide and imide nonpolymeric surfactant asphaltene dispersants, and alkylphenols and related asphaltene dispersants; and oligomeric (resinous) and polymeric asphaltene dispersants, such as alkylphenol-aldehyde resin oligomers, polyester and polyamide/imide asphaltene dispersants and asphaltene dissolvers. Exemplary asphaltene treating chemicals include, but are not limited to, fatty ester homopolymers and copolymers (such as fatty esters of acrylic and methacrylic acid polymers and copolymers) and sorbitan monooleate.

Acid stimulation chemicals include corrosion inhibitors for acidizing, nitrogen based corrosion inhibitors, oxygen-containing corrosion inhibitors, including those with unsaturated linkages, corrosion inhibitors containing sulphur, ion control agents, water wetting agents, oil-wetting agents, weak organic acids, weak sandstone-acidizing fluorinated agents, buffered acids, gelled or viscous acids, foamed acids, temperature-sensitive acid-generating chemicals and enzymes and emulsified acids.

Sand control agents include resins and organosilanes.

Anti-fouling agents include napthenate and other carboxylate anti-fouling agents.

Corrosion control agents include film-forming corrosion inhibitors (FFCI's) such as phosphate esters, amine salts of polycarboxylic acids, quaternary ammonium and iminium salts and zwitterionics, amidoimines and imidazolines, amides, polyhydroxy and ethoxylated amines/amides, nitrogen containing heterocycles, sulfur containing compounds and polyamino acids. Exemplary corrosion inhibitors include, but are not limited to, fatty imidazolines, alkyl pyridines, alkyl pyridine quaternaries, fatty amine quaternaries and phosphate salts of fatty imidazolines.

Gas hydrate control agents include thermodynamic hydrate inhibitors (THI's); kinetic hydrate inhibitors (KHI's), such as vinyl lactam KHI polymers, hyperbranched polyester amide KHI's, pyroglutamate KHI polymers and polydialkylmethacrylamide KHI's; anti-agglomerates (AA's), such as emulsion pipeline AA's, hydrate-philic pipeline AA's, natural surfactants and nonplugging oils, gas well AA's and gas hydrate plug removal agents. Exemplary gas hydrate control agents include, but are not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Wax (paraffin wax) control agents include wax solvents, thermochemical wax control packages, chemical wax prevention agents, such as wax inhibitors, ethylene polymers and copolymers, comb polymers (methacrylic ester polymers and maleic copolymers), wax dispersants and polar crude fraction flow improvers. Exemplary paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Demulsifiers include polyalkoxylate block copolymers and ester derivatives, alkylphenol-aldehyde resin alkoxylates, polyalkoxylates of polyols or glycidyl ethers, polyamine polyalkoxylates and related cationic polymers, polyurethanes (carbamates) and polyalkoxylate derivatives, hyperbranched polymers, vinyl polymers, polysilicones, dual-purpose demulsifiers and biodegradable demulsifiers. Exemplary demulsifying agents include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of such di-functional products. Preferred non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide, etc.

Foam control agents include defoamers and antifoamers, such as silicones and fluorosilicones, and polyglycols.

Exemplary foaming agents include, but are not limited to, oxyalkylated sulfates or ethoxylated alcohol sulfates, or mixtures thereof.

Flocculants include cationic polymers such as dialkyldimethylammonium chloride polymers, acrylamide or acrylate-based cationic polymers; environmentally-friendly cationic polymeric flocculants; dithiocarbamates; anionic polymers and amphoteric polymers.

Hydrogen sulfide scavengers include nonregenerative $H_2S$ scavengers, such as solid scavengers, oxidising chemicals, aldehydes, reaction products of aldehydes and amines, such as triazines, and metal carboxylates and chelates.

Oxygen scavengers include dithionite salts, hydrazine and guanidine salts, hydroxylamines and oximes, activated aldehydes and polyhydroxyl compounds, catalytic hydrogenation agents, enzymes, sulfided iron reagents, bisulfite, metabisulfite and sulphate salts. Exemplary oxygen scavengers include triazines, maleimides, formaldehydes, amines, carboxamides, alkylcarboxyl-azo compounds, cumine-peroxide compounds, morpholino and amino derivatives, morpholine and piperazine derivatives, amine oxides, alkanolamines, aliphatic and aromatic polyamines.

Drag-reducing agents (DRA's) include oil-soluble DRA's, such as polyalkene (polyolefin) DRA's and polymethacrylate ester DRA's, and water-soluble DRA's, such as polysaccharides and derivatives, polyethylene oxide DRA's, acrylamide-based DRA's and water-soluble surfactant DRA's. Exemplary surfactants include cationic, amphoteric, anionic and nonionic surfactants. Cationic surfactants include those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Amphoteric surfactants include glycinates, amphoacetates, propionates, betaines and mixtures thereof. The cationic or amphoteric surfactant can have a hydrophobic tail (which can be saturated or unsaturated) such as a $C_{12}$-$C_{18}$ carbon chain length. Further, the hydrophobic tail can be obtained from natural oil from plants such as one or more of coconut oil, rapeseed oil and palm oil. Preferred surfactants include N,N,N-trimethyl-1-octadecammonium chloride: N,N,N-trimethyl-1-hexadecammonium chloride; and N,N,N-trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Hydrotesting chemicals include biocides, oxygen scavengers, corrosion inhibitors, dyes and environmentally friendly agents.

Foamers for gas well deliquification can also be used.

The invention claimed is:

1. A process for producing an oil field chemical-carrying material, the process comprising:
    microencapsulating the oil field chemical in a plurality of polymeric microcapsules each comprising the oil field chemical and a polymeric microencapsulant;
    distributing the plurality of polymeric microcapsules in a pre-polymeric matrix material to form an oil field chemical carrying mixture;
    processing and forming the oil field chemical carrying mixture to produce a precursor formation comprising a distribution of the polymeric microcapsules within a continuous solid matrix phase of polymeric material; and
    comminuting the precursor formation to produce a plurality of proppant particles having a size in a range 0.1 to 3 mm, each proppant particle comprising a plurality of the polymeric microcapsules embedded in the solid matrix phase of polymeric material,
    wherein the oil field chemical is a tracer, a viscosity modifier, a density modifier, a flow modifier, a gelling modifier, a lubricant, a foaming modifier, a scale inhibitor, a disinfectant, an anti-freeze or a corrosion inhibitor.

2. A process according to claim 1, wherein the pre-polymeric matrix material is a flowable material into which the polymeric microcapsules are distributed by mixing.

3. A process according to claim 2 wherein the pre-polymeric matrix material comprises a fluid.

4. A process according to claim 2, wherein the pre-polymeric matrix material comprises a flowable solid powder.

5. A process according to claim 1, wherein the solid matrix phase of polymeric material comprises a polyethylene, a polypropylene, a polyacrylate, an aliphatic polyamide, a polyurethane, a vinyl ester, an epoxy resin or a polybutylene terephthalate.

6. A process according to claim 1, comprising screening the particles produced by the comminuting step against a target size range and discarding particles that fall outside the target size range.

7. A process according to claim 1, wherein the particles are subsequently coated.

8. A process according to claim 1, wherein the oil field chemical comprises a tracer.

* * * * *